(No Model.)
L. D. HENLEY.
SEED DROPPER.
No. 244,894. Patented July 26, 1881.
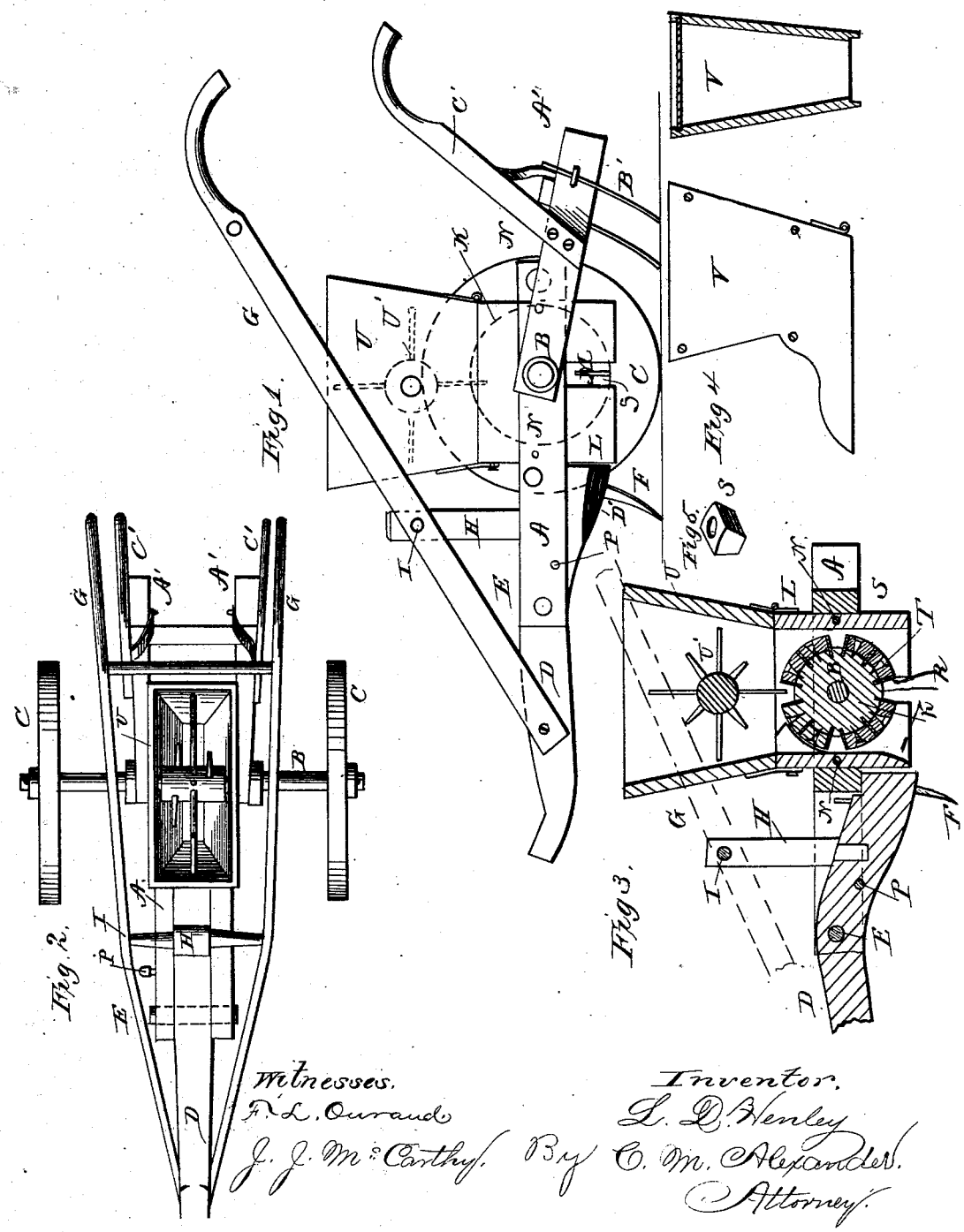

UNITED STATES PATENT OFFICE.

LOUIS D. HENLEY, OF CLIFTONVILLE, MISSISSIPPI.

SEED-DROPPER.

SPECIFICATION forming part of Letters Patent No. 244,894, dated July 26, 1881.

Application filed June 8, 1881. (No Model.)

*To all whom it may concern:*

Be it known that I, LOUIS D. HENLEY, of Cliftonville, in the county of Noxubee, and in the State of Mississippi, have invented certain new and useful Improvements in Seed-Droppers; and I do hereby declare that the following is a full, clear, and exact description thereof, reference being had to the accompanying drawings and to the letters of reference marked thereon, making a part of this specification.

This invention has for its objects to produce an apparatus that may be employed as a cotton planter, seeder, or cultivator at will, as more fully hereinafter specified. These objects I attain by the apparatus illustrated in the accompanying drawings, in which—

Figure 1 represents a side elevation of my improved apparatus; Fig. 2, a top view thereof; Fig. 3, a longitudinal vertical section; Fig. 4, detached views of the seeding-hopper to be employed with the apparatus; and Fig. 5, a detached view of one of the parts of the seed-distributing wheel.

The letter A indicates the frame of the apparatus; B, the axle passing transversely through the frame, and is journaled in suitable bearings therein.

The letter C indicates the wheels, which are rigidly secured to the axle in any convenient manner.

The letter D indicates a plow-beam, which is pivoted at E between the parallel beams of the frame A. The said plow-beam is provided with a plowshare or opener, F, at its rear, and is capable of a movement on its pivot, whereby the share may be elevated or depressed in order to cause the plow to take into the ground to a greater or less extent, as may be desired.

The letter G indicates the plow-handles, which are attached at their forward ends to the forward part of the beam, and to the rear of the beam by an upright, A', and transverse bar, I, in order to steady the plow. To the axle is secured, rigidly, a distributing-wheel, K. This is located within a movable box, L, which is slotted vertically, as indicated by the letter M, in such manner that it may be readily passed over the axle for the purpose of removal and replacement. The said box is held in place by means of through-bolts, N, which may be removed at pleasure, and a similar through-bolt, P, may be passed through the frame and plow-beam to hold the beam rigidly when required.

The distributing-wheel is provided with a series of peripheral pockets, R, in which are adapted to be fitted the blocks S, (shown in detail in Fig. 5,) the said blocks being held, when in place, by means of the screws T. By means of these blocks the peripheral pockets may be either wholly or partially filled, so as to adapt the apparatus to be used either as a cotton planter or seeder for planting various grains or cereals.

The letter U indicates a removable hopper, in which is located an agitator, U', mounted in bearings at each side of the hopper. The said agitator is provided with a series of long and short arms, the long arms being so arranged as to be engaged by the pockets in the distributing-wheel in such manner as to rotate the agitator.

The letter V indicates a hopper which may be substituted for the hopper U when it is desired to employ the apparatus as a corn-planter.

To the axle of the apparatus is loosely hung a cultivator-frame, A', which is provided with a series of cultivator-teeth, B', and suitable handles, C'. The said teeth act as coverers when the apparatus is employed as a planter or seeder. When employed as a cultivator the seed-distributing box and the hopper are removed so as to be out of the way.

The plow-beam on each side at the rear is curved, as indicated by the letter D', the curved portion acting as a spreader to open the furrow formed by the plow.

Having thus described my invention, what I claim, and desire to secure by Letters Patent, is—

In combination with the frame A of the apparatus and its pivoted plow-beam D the removable box and hopper U, the distributing-wheel K and its peripheral pockets with removable blocks S, and the agitator U', located in the hopper and provided with a series of long and short arms, the former adapted to engage the pockets, whereby motion is transmitted to the agitator, substantially as specified.

In testimony whereof I affix my signature, in presence of two witnesses, this 25th day of May, 1881.

LOUIS D. HENLEY.

Witnesses:
CLARKE LEWIS,
F. H. DANTZLER,